United States Patent
Bae et al.

(10) Patent No.: US 7,248,569 B2
(45) Date of Patent: Jul. 24, 2007

(54) METHOD AND SYSTEM FOR DISCONNECTING A TERMINATING CONNECTION LEG (LEG2) FOR ENHANCED DIALED SERVICES IN A MOBILE INTELLIGENT NETWORK

(75) Inventors: Su-Jin Bae, Suwon-si (KR); Sung-Bum Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 665 days.

(21) Appl. No.: 10/807,717

(22) Filed: Mar. 24, 2004

(65) Prior Publication Data

US 2005/0213520 A1 Sep. 29, 2005

(51) Int. Cl.
*H04Q 7/00* (2006.01)
*H04J 3/12* (2006.01)

(52) U.S. Cl. .................. 370/328; 370/338; 370/522; 455/433; 455/432.1

(58) Field of Classification Search ................ 370/328, 370/338, 522; 455/433, 432.1, 432.2
See application file for complete search history.

(56) References Cited

U.S. PATENT DOCUMENTS

2004/0067753 A1* 4/2004 Berg et al. .............. 455/435.1
2004/0224680 A1* 11/2004 Jiang ........................ 455/433
2005/0164707 A1* 7/2005 Batni et al. ............... 455/445
2006/0115068 A1* 6/2006 Dotan et al. ........... 379/221.15

* cited by examiner

Primary Examiner—William Trost
Assistant Examiner—Julio Perez
(74) Attorney, Agent, or Firm—The Farrell Law Firm (57) ABSTRACT

A method and system for disconnecting a terminating connection leg in a dialed service for a mobile subscriber in an MSC in a mobile intelligent network. Upon receipt of Int_Disconnect_Leg (Leg2) from an SCP in a DP_Analysed_Info state in a call initialization procedure for handling of an MO or MF call, The MSC transmits Int_Disconnect_Leg_Ack to the SCP, releases Leg2, and enters a Leg2_Disconnected state. Upon receipt of Int_Continue in the Leg2_Disconnected state, the MSC sets "Result" to "Leg1_Only". Upon receipt of Int_Continue_With_Argument in the Leg2_Disconnected state, the MSC modifies stored information by information included in the message, and sets "Result" to "Leg1_Only". The MSC provides supplementary functions under the control of the SCP if "Result" is "Leg1_Only".

22 Claims, 10 Drawing Sheets

METHOD AND SYSTEM FOR DISCONNECTING A TERMINATING CONNECTION LEG (LEG2) FOR ENHANCED DIALED SERVICES IN A MOBILE INTELLIGENT NETWORK

BACKGROUND OF THE INVENTION

1. Field of the Invention

The present invention relates generally to a mobile communication network, and in particular, to a method and system for enhancing subscribed and serving network dialed services for CAMEL (Customized Applications for Mobile network Enhanced Logic) services.

2. Description of the Related Art

CAMEL services are provided in a WCDMA (Wideband Code Division Multiple Access) mobile communication network. CAMEL is an IN (Intelligent telecommunications Network)-based tool to assist network operators or service providers in providing subscribers with operator specific services (OSS) even when roaming outside the HPLMN (Home Public Land Mobile Network).

A CAMEL service is identified by CSI (CAMEL Subscription Information) indicating that CAMEL support is required for a subscriber or a service. The CAMEL service is invoked by CSI assigned on a per-subscriber basis or on a per-network basis. The CSI contains a service key, a DP (Detection Point) list indicating on which DP triggering shall take place, triggering criteria, the address of a service logic providing the CAMEL service, and default call handling indicating whether a call should be released or continued in case of errors.

CSI available to subscribers includes O-CSI (Originating CSI), D-CSI (Dialed CSI), and N-CSI (Network CSI). The O-CSI identifies the subscriber as having originating CAMEL services. The D-CSI identifies the subscriber as having CAMEL dialed services by a service number entered by the subscriber. The N-CSI identifies services offered on a per-network basis for all subscribers connected to a particular network.

In a CAMEL service network, subscribed dialed services, triggered by a D-CSI assigned to a CAMEL subscriber, routes a call to a destination by a service number entered by the CAMEL subscriber. The service number may be different from a destination phone number. Each service number is defined and chosen at a service provider's discretion.

Subscribed network dialed services, triggered by an N-CSI assigned to a network, route a call to a corresponding destination according to a predetermined number entered by a subscriber. The same number applies to all originating subscribers. Calling at "800-xxx-xxxx" is an example of the serving network dialed services.

For one call, a CAMEL service is triggered via an O-CSI and then, when necessary, via a D-CSI and an N-CSI, subsequently. As described above, unlike the O-CSI, the D-CSI and N-CSI serve simply for call routing. Therefore, the conventional CAMEL service network, supports a variety of supplementary functions, such as charging, call monitoring, release of terminating connection, no answer, etc., only during a service triggered via the O-CSI in processing of a call. As a result, there is a need for techniques enabling such supplementary functions as supported via the O-CSI during a service triggered via the D-CSI or N-CSI.

SUMMARY OF THE INVENTION

Therefore, the present invention has been designed in view of the above and other problems, and it is an object of the present invention to provide a method of supporting supplementary services in D-CSI/N-CSI-triggered dialed services in a CAMEL service network.

Another object of the present invention is to provide a method and system for disconnecting a terminating connection leg only by a command from an IN node in D-CSI/N-CSI-triggered dialed services in a CAMEL service network.

A further object of the present invention is to provide a method and system for handling a terminating connection leg (leg2) disconnected state in D-CSI/N-CSI-triggered dialed services in a CAMEL service network.

Still another object of the present invention is to provide a method and system for processing input messages in a terminating connection leg disconnected state in D-CSI/N-CSI-triggered dialed services and outputting the process results in a CAMEL service network.

The above and other objects are achieved by a method and system for disconnecting a terminating connection leg in a dialed service for a mobile subscriber in a mobile switching center (MSC) that provides a mobile intelligent network service to the mobile subscriber under a control of a service control point (SCP) in a mobile intelligent network.

According to one aspect of the present invention, in a method of disconnecting a terminating connection leg in a dialed service for a mobile subscriber in an MSC that provides a mobile intelligent network service to the mobile subscriber under the control of an SCP in a mobile intelligent network, the MSC receives a message requesting disconnection of the terminating connection leg from the SCP, in a waiting state, after transmitting a service request message to the SCP in a call initialization procedure for handling of a mobile originating (MO) call or a mobile forwarding (MF) call. The MSC transmits an acknowledgement for the message requesting disconnection of the terminating connection leg to the SCP, releases the terminating connection leg with an originating connection leg maintained, and enters a terminating connection leg disconnected state. Upon receipt of a message requesting call continuation from the SCP in the terminating connection leg disconnected state, the MSC sets the result of the call initialization procedure to "terminating connection leg disconnected".

Upon receipt of a message requesting call continuation according to modified information in the terminating connection leg disconnected state, the MSC modifies stored information by information included in the message requesting call continuation, and sets the result of the call initialization procedure to "terminating connection leg disconnected". If the result of the call initialization procedure is "terminating connection leg disconnected", the MSC provides supplementary functions available along with the disconnection of the terminating connection leg under the control of the SCP.

According to another aspect of the present invention, in a method of disconnecting a terminating connection leg in a dialed service for a mobile subscriber in an MSC that provides a mobile intelligent network service to the mobile subscriber under the control of an SCP in a mobile intelligent network, if an MO call is set up, the MSC determines whether the MO call is allowed. If the MO call is allowed, the MSC performs a service initialization procedure for handling of the MO call. If the result of the service initialization procedure is "pass," the MSC performs an MO call dialed service procedure. If the result of the MO call dialed service procedure is "leg1_only" indicating disconnection of the terminating connection leg only, the MSC performs a procedure for controlling an originating connection leg under the control of the SCP, and provides supplementary functions available along with the disconnection of the terminating connection leg.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail since they would obscure the invention in unnecessary detail.

The present invention is directed to disconnecting a terminating connection leg for D-CSI/N-CSI-triggered dialed services in a CAMEL service network. A system configuration and procedure for enhancing CAMEL procedures as provided by the 3GPP ($3^{rd}$ Generation Partnership Project) TS (Technical Specification) 23.078 and TS 23.018 for WCDMA will be described herein, although the present invention is not limited to the description.

Figure 1:
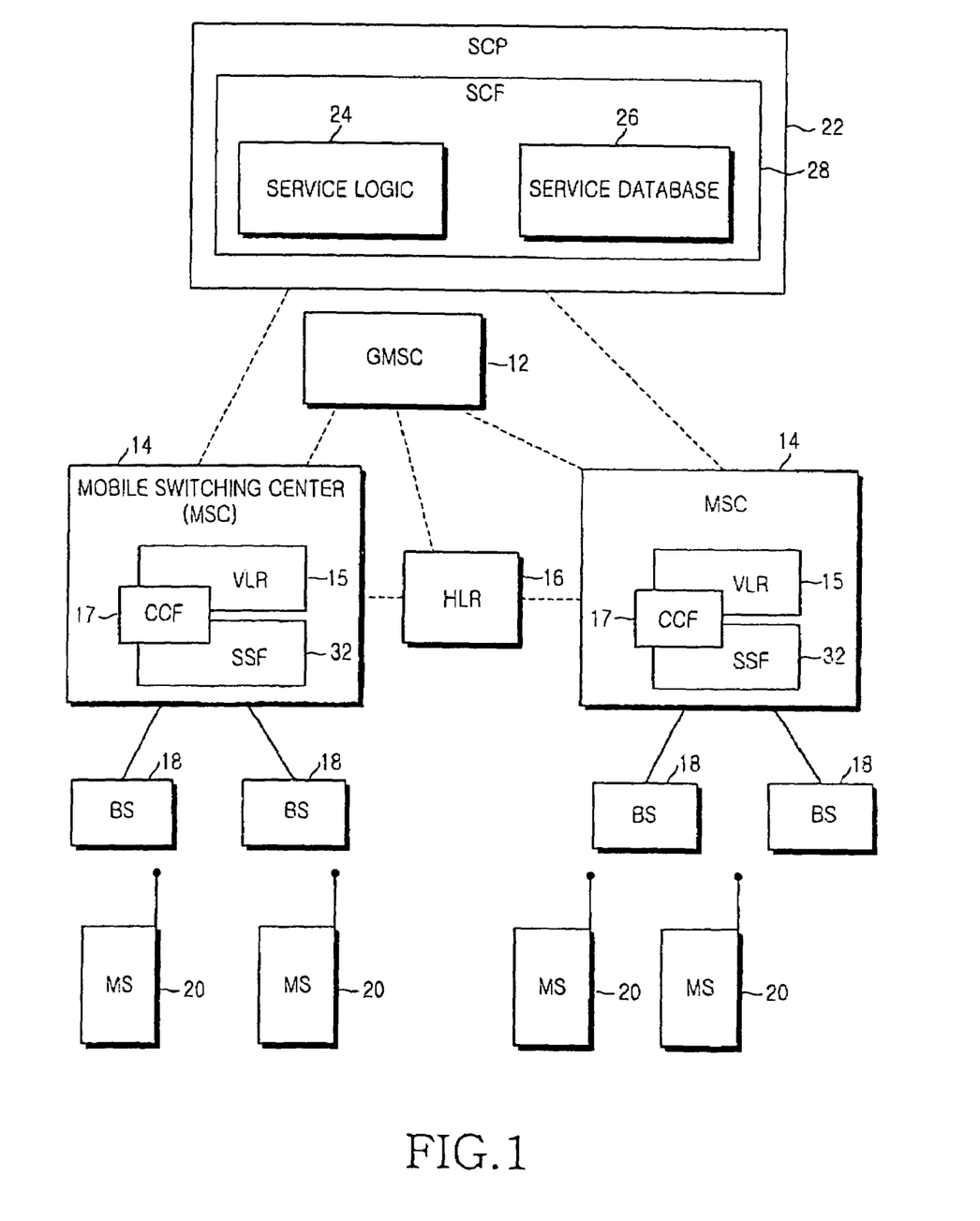
FIG. 1 is a function block diagram illustrating a mobile communication network in which the present invention is implemented according to a preferred embodiment of the present invention.

FIG. 1 is a function block diagram illustrating a mobile communication network 10 in which the present invention is implemented according to a preferred embodiment of the present invention. Referring to FIG. 1, a gateway mobile switching center (GMSC) 12 interfaces with other communication networks such as the public switched telephone network (PSTN), integrated services digital network (ISDN), or other cellular networks. The GMSC 12 connects to one or more mobile switching centers (MSCs) 14. The GMSC 12 is the interface point in the mobile communication network 10 for calls to mobile subscribers. Although the GMSC 12 is illustrated as a separate node for clarity of illustration, it can be included with an MSC node.

Each MSC 14 performs telephony switching functions associated with calls involving mobile stations (MSs) 20, which are wirelessly connected to base stations (BSs) 18, including interfacing with other communication networks and routing mobile-originated calls. Each MSC 14 includes a functional entity called a call control function (CCF) 17 that takes charge of at least one call. Each MSC 14 is associated with a visiting location register (VLR) 15, which includes a database containing the information about all MSs currently located in a corresponding service area. The VLR contains temporary subscriber information needed by the MSC 14 to provide services to MSs in its service area.

Typically, when an MS enters into a visiting service area (usually, this is called roaming), the corresponding VLR requests and receives data about the roaming MS from the MS's HLR 16 and stores it. As a result, when the MS makes a call, the VLR already has the information needed for the call setup. The HLR 16 is a stand-alone node, and the VLR 15 is integrated with the corresponding MSC 14.

The HLR 16 is a database that stores and manages subscriptions. For each "home" MS, the HLR 16 contains permanent subscriber data such as an international mobile subscriber identity (IMSI) and a list of services that an MS is authorized to use.

As indicated above, CAMEL is an IN-based mechanism for providing supplementary services in addition to the basic telephony services in a WCDMA-based network. Accordingly, the MSC 14 includes a functional entity called a service switching function (SSF) 32 that interfaces the MSC 14 to a service control point (SCP) 22. The SSF 32 is similar to that used in a fixed telephony IN but uses different triggering mechanisms consistent with mobile communications networks. The points in processing of a call at which a service is triggered in the SSF 32 are called detection points (DPs). A plurality of DPs corresponding to different service triggerings may exist in each SSF 32.

The SCP 22 includes a service control function (SCF) 28 and a service logic 24 for providing one or more CAMEL-constructed services. The SCP 22 works in a CAMEL service environment (CSE), distinguishably from a general IN. For example, the service logic 24 includes a call forwarding service logic that, upon input of a nationwide representative number for call setup, instead of a destination phone number, searches for a destination corresponding to the nationwide representative number in a service database 26 and routes a call to the destination.

Figure 2:
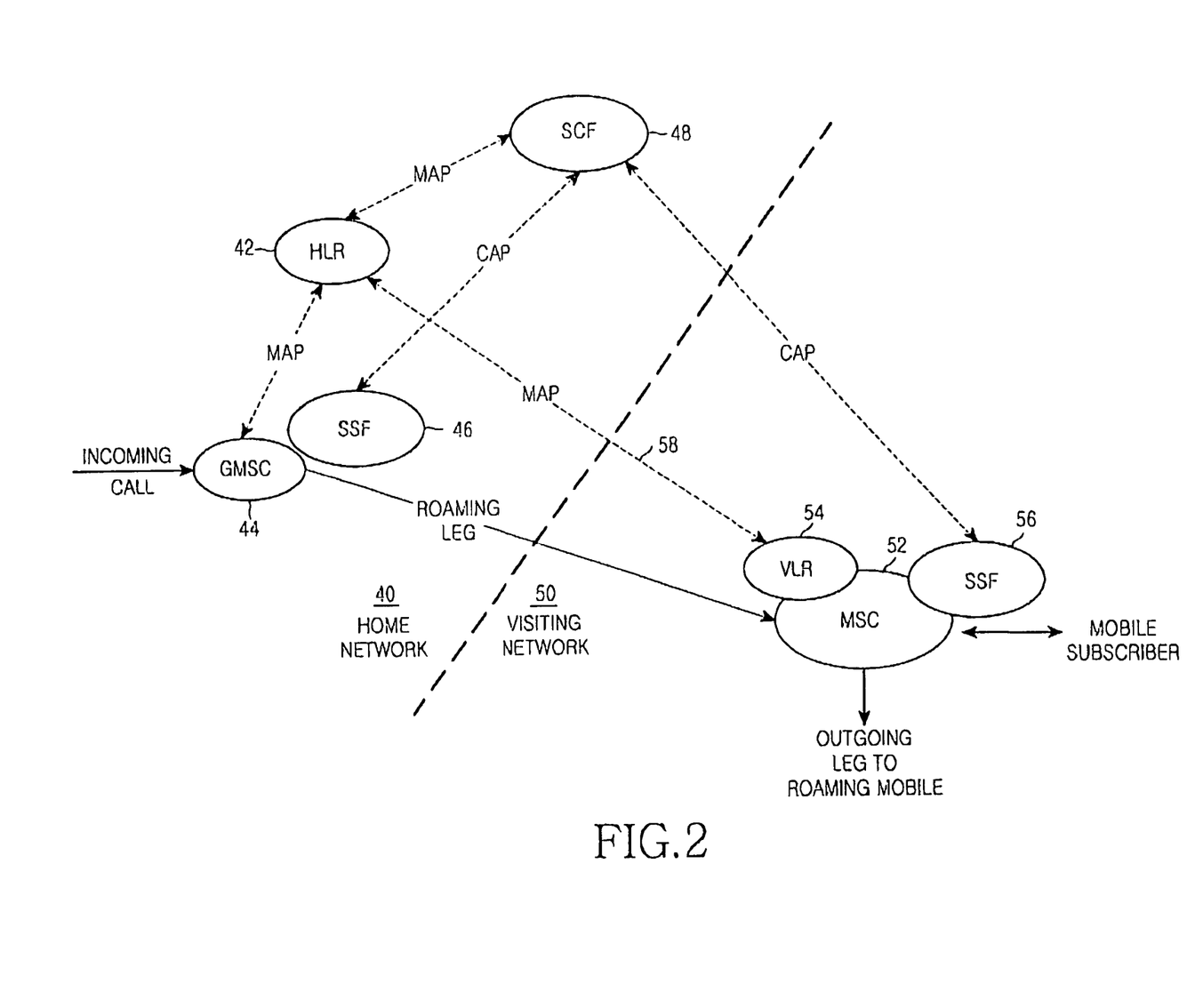
FIG. 2 illustrates a configuration of a CAMEL service network in which MSs can receive basic and supplementary services in a visiting network according to an embodiment of the present invention

FIG. 2 illustrates a configuration of a CAMEL service network in which MSs 20 can receive basic and supplementary services in a visiting network according to an embodiment of the present invention. Referring to FIG. 2, a home network 40 includes an HLR 42, a GMSC 44, an SSF 46, and an SCF 48. The HLR 42 communicates with the GMSC 44 and the SCF 48 using a mobile application part (MAP) protocol. The SSF 46 and the SCF 48 communicate using a CAMEL application part (CAP) protocol. A visiting network 50 includes an MSC 52, a VLR 54, and an SSF 56. The HLR 42 and the VLR 54 communicate using the MAP protocol, and the SCF 48 and the SSF 56 communicate using the CAP protocol.

When an incoming call for a mobile subscriber is received at the GMSC 44 in the home network 40, a roaming leg is established between the GMSC 44 and the MSC 52 in the visiting network 50. The MSC 52 then establishes an outgoing leg to the roaming mobile subscriber.

When an MS is powered-on or registers its location, the HLR transmits to the VLR of the MSC in which the MS is currently located, subscriber information about the MS, including location, subscriber status, subscribed supplementary services, and CAMEL service information (i.e., CSI). If the MS originates a call, the MSC determines whether the subscriber has CSI by analyzing the subscriber information stored in the VLR.

If the mobile subscriber has CSI, the MSC determines whether trigger criteria set in the CSI are satisfied. If the trigger criteria are met, the MSC requests invocation of a CAMEL service to an SCP having corresponding CAMEL service logic. The MSC performs the CAMEL service as commanded by the SCP.

CSI is assigned to every CAMEL subscriber. The MSC searches CSI stored for each subscriber in the VLR in the order of O-CSI, D-CSI, and N-CSI and triggers an originating CAMEL service.

The MSC provides the CAMEL service in the following manner.

The CCF in the MSC performs a call process using an originating basic call state model (O-BCSM) for the originating CAMEL service. If predefined DP trigger criteria are met during the basic call process based on the O-BCSM, CAMEL triggering occurs via the O-CSI. Thereafter, if corresponding trigger criteria are met, CAMEL triggerings occur via the D-CSI and the N-CSI, sequentially The O-CSI-triggered CAMEL service is in a control/monitor relationship with the SCP. The CCF routes a call, senses a response from a called party and a call release, reports and collects mid-call events, and collects and controls charging information. In effect, the MSC monitors events, maintaining the relationship with the SCP.

Some subscribers may receive CAMEL services via all of the O-CSI, D-CSI and N-CSI. If CAMEL services are triggered via the D-CSI and N-CSI after an O-CSI-triggered service, D-CSI-based and N-CSI-based CAMEL processing is performed.

More specifically, disconnecting a terminating connection leg called leg2 refers to a function that, after the CCF of the MSC receives a message Int_Disconnect_Leg (Leg2) requesting disconnection of leg2 from the SCP in a DP_Collected_Info state during a CAMEL service and transitions to a Leg2_Disconnected state, enables the CCF to process an additional request (error message, call continuation, call release, and call waiting/forwarding) received from the SCP or a caller.

In implementing service logics for various CAMEL services, it may occur that a terminating connection leg is released before a call is routed to a destination and then the call is routed to a new destination. For example, particular calls directed to a called party are connected to a voice mailing service (VMS) server by a setting of the called party. The setting can be made known via D-CSI.

Accordingly, a preferred embodiment of the present invention supports disconnecting a terminating connection leg while handling a mobile originating (MO) call or a mobile forwarding (MF) call in D-CSI-based and N-CSI-based CAMEL dialed services, based on various CSI as performed in the CCF of an MSC.

The 3GPP TS 23.078 specifies the MO and MF call handling procedures of CAMEL_SDS_MO_INIT, CAMEL_MO_Dialled_Services, CAMEL_CF_Dialled_Services, CAMEL_NDS_MO_INIT, CAMEL_SDS_CF_INIT, and CAMEL_NDS_CF_INIT. The 3GPP TS 23.018 specifies the MO and MF call handling procedures of OG_Call_Setup_MSC and MT_CF_MSC. In CAMEL terminology, SDS represents subscribed dialed services, NDS represents network dialed services, OG represents originating, MT represents mobile terminating, and CF represents call forwarding.

When the MSC knows that subscriber information stored in the VLR indicates a dialed service during the OG_Call_Setup_MSC procedure for MO call handling, the MSC performs the CAMEL_MO_Dialled_Services procedure. During the CAMEL_MO_Dialled_Services procedure, the CAMEL_SDS_MO_INIT and CAMEL_NDS_MO_INIT procedures can be invoked.

Additionally, when the MSC knows that subscriber information stored in the VLR indicates a dialed service during the MT_CF_MSC procedure for MF call handling, the MSC performs the CAMEL_CF_Dialled_Services procedure. During the CAMEL_CF_Dialled_Services procedure, the CAMEL_SDS_CF_INIT and CAMEL_NDS_CF_INIT procedures can be invoked.

Figure 3:
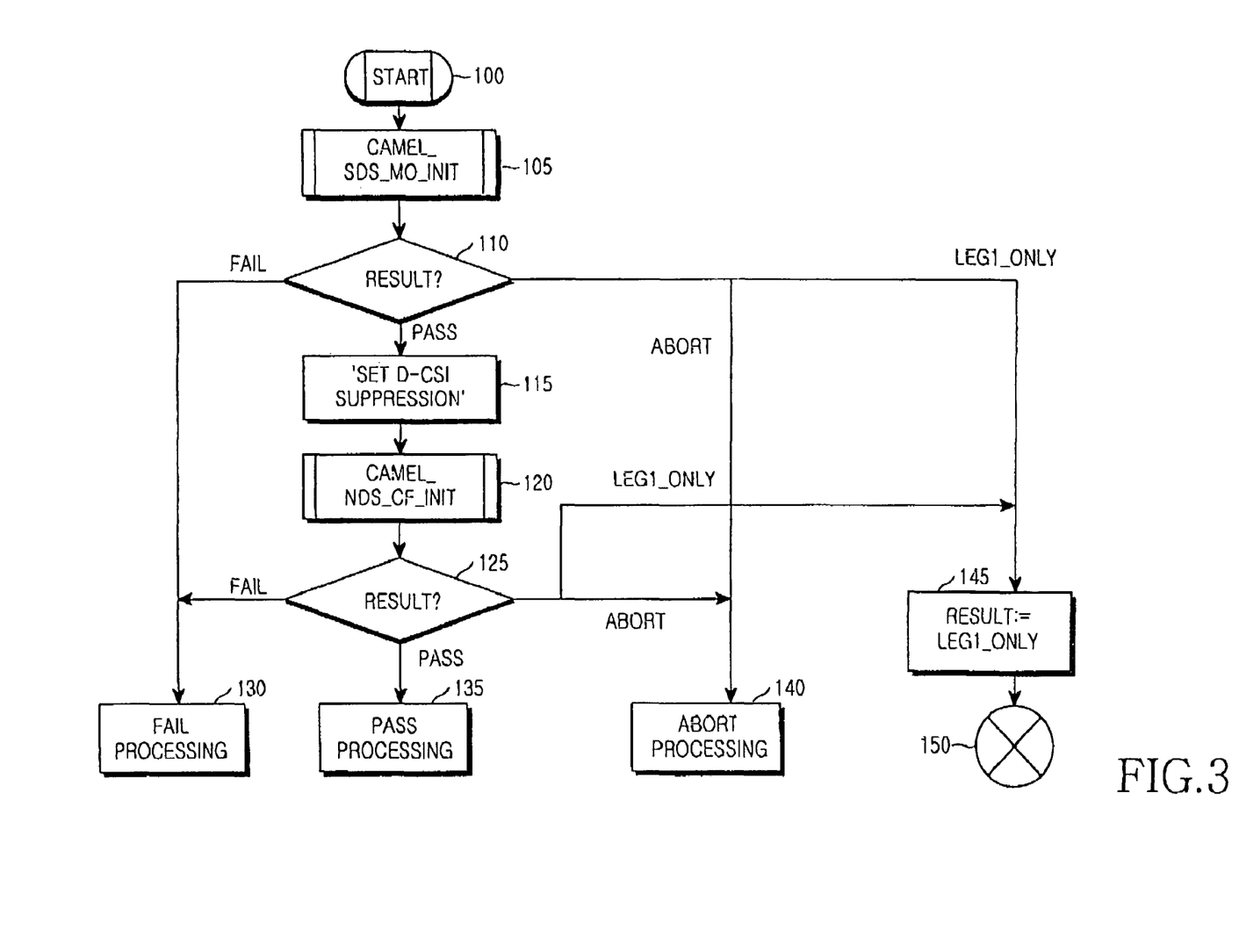
FIG. 3 is a flowchart illustrating a procedure for a mobile originating (MO) call dialed service according to an embodiment of the present invention.

FIG. 3 is a flowchart illustrating a procedure for an MO call dialed service according to an embodiment of the present invention. Specifically, the CAMEL_MO_Dialled_Services procedure is illustrated, which is invoked by service triggering via a D-CSI (or N-CSI, hereinafter only the D-CSI is described as an example).

Referring to FIG. 3, the CAMEL_MO_Dialled_Services procedure is invoked in step 100. In step 105, the CAMEL_SDS_MO_INIT procedure is invoked to initialize a subscriber-specific MO call dialed service. The CAMEL_SDS_MO_INIT procedure is described in more detail with reference to FIGS. 5A to 5D herein below.

After the completing the CAMEL_SDS_MO_INIT procedure, the result "Result" is returned. The result "Fail" indicates failure, "Pass" indicates success, "Abort" indicates termination, and "Leg1_only" indicates the presence of only an originating connection leg according to the present invention.

In step 110, the MSC identifies the result of the CAMEL_SDS_MO_INIT procedure. If "Result=Pass", the MSC suppresses the already-triggered D-CSI to prevent its retriggering in step 115 and performs the CAMEL_NDS_MO_INIT procedure to initialize a network-specific MO call dialed service in step 120. The same detailed description in FIGS. 5A to 5D also applies to the CAMEL_NDS_MO_INIT procedure like the CAMEL_SDS_MO_INIT procedure.

In step 125, the MSC identifies the result of the CAMEL_NDS_MO_INIT procedure. The results of the CAMEL_NDS_MO_INIT procedure also include Fail, Pass, Abort, or Leg1_only. If "Result=Pass", the MSC performs a call process corresponding to the result Pass in step 135.

Also in step 135, the MSC determines whether another CAMEL service has been requested. If another CAMEL service has been requested has, the MSC determines whether the request is for a call reconnection. If the request is not for the call reconnection, the MSC suppresses an O-CSI and information for an outgoing call is requested to the SCP. However, if the request is not for the call reconnection, information for the call reconnection is requested from the SCP.

If "Result=Fail" in either step 110 or step 125, the MSC performs a call process corresponding to the result Fail in step 130. At the failure, the MSC determines whether the failure is a reconnection failure. If the failure is a reconnection failure, the MSC returns to step 105 and otherwise, the MSC ends the MO call dialed service.

If "Result=Abort" in either step 110 or step 125, the MSC performs a call process corresponding to the result Abort in step 140.

If "Result=Leg1_only" in either step 110 or step 125, the MSC sets "Result:=Leg1_only" to indicate the presence of an originating connection leg only in step 145 and terminates the CAMEL_MO_Dialled_Services procedure in step 150. Then, the OG_Call_Setup_MSC procedure is resumed. The OG_Call_Setup_MSC procedure will be described in more detail herein below with reference to FIG. 6.

Figure 4:
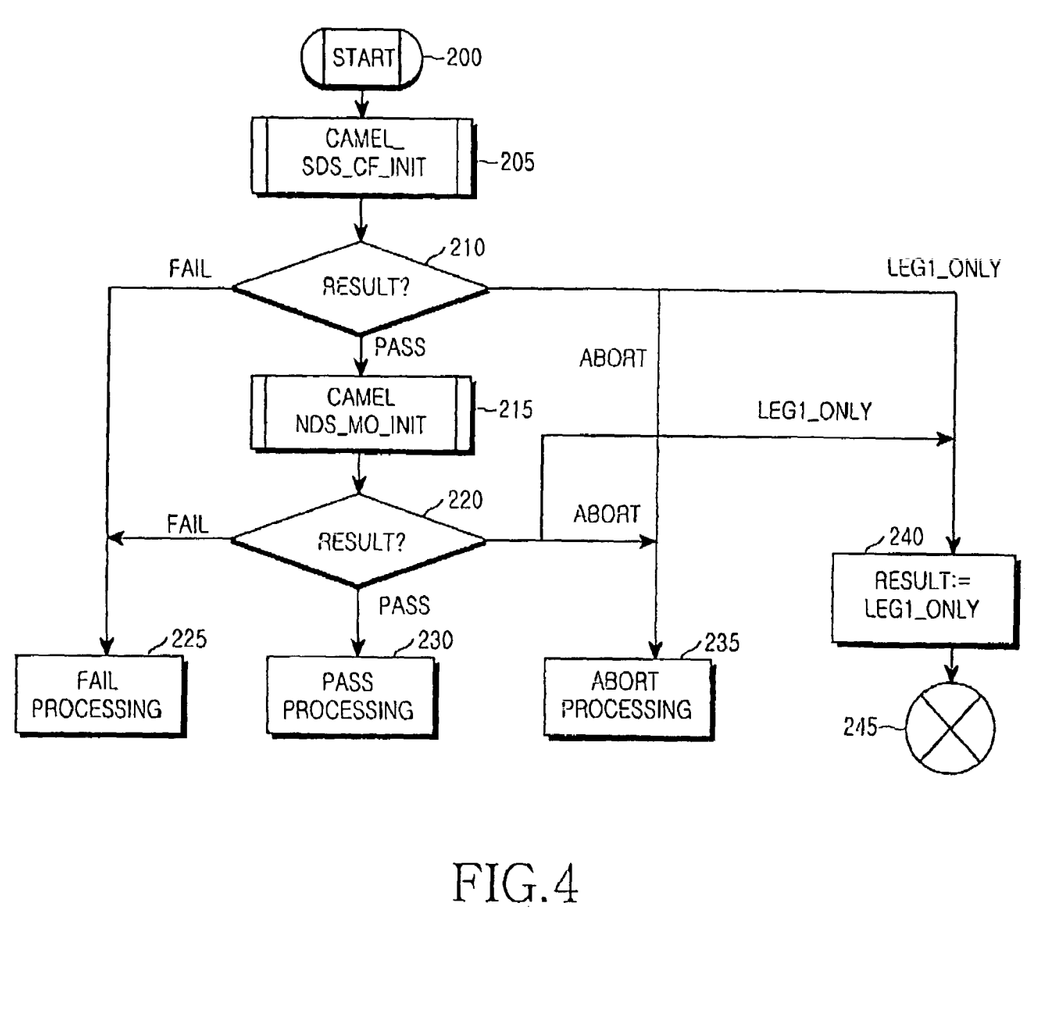
FIG. 4 is a flowchart illustrating a procedure for a mobile forwarding (MF) call dialed service according to an embodiment of the present invention.

FIG. 4 is a flowchart illustrating a procedure for an MF call dialed service according to an embodiment of the present invention. More specifically, FIG. 4 illustrates the CAMEL_CF_Dialled_Services, which is invoked by service triggering via a D-CSI or N-CSI. Hereinafter, only the D-CSI is mentioned as an example.

Referring to FIG. 4, the CAMEL_CF_Dialled_Services procedure is invoked in step 200. In step 205, the CAMEL_SDS_CF_INIT procedure is invoked to initialize a subscriber-specific MF call dialed service. The CAMEL_SDS_CF_INIT procedure is similar to the CAMEL_SDS_MO_INIT procedure. After completing the CAMEL_SDS_CF_INIT procedure, a "Result" is returned. As described above, the result includes Fail, Pass, Abort, or Leg1_only according to the present invention.

In step 210, the MSC identifies the result of the CAMEL_SDS_CF_INIT procedure. If "Result=Pass", the MSC performs the CAMEL_NDS_CF_INIT procedure to initialize a network-specific MF call dialed service in step 215. The CAMEL_NDS_CF_INIT procedure is similar to the CAMEL_SDS_CF_INIT procedure.

In step 220, the MSC identifies the result of the CAMEL_NDS_CF_INIT procedure. If "Result=Pass", that is, if both the subscriber-specific MF call initialization and the network-specific MF call initialization are successful, the MSC performs a call process corresponding to the result Pass in step 230. Additionally, the MSC sets the result of the MF call dialed service procedure to "Pass".

If "Result=Fail" in either step 210 or step 220, the MSC performs a call process corresponding to the result Fail in step 225. In step 225, the MSC sets the result of the MF call dialed service procedure to "Fail".

If "Result=Abort" in either step 210 or step 220, the MSC performs a call process corresponding to the result Abort in step 235. In step 235, the MSC sets the result of the MF call dialed service procedure to "Abort".

If "Result=Leg1_only" in either step 210 or step 220, the MSC sets "Result:=Leg1_only" to indicate the presence of an originating connection leg only in step 240 and terminates the CAMEL_CF_Dialled_Services procedure in step 245. Then, the MT_CF_MSC procedure is resumed.

As indicated above, FIGS. 5A to 5D are flowcharts illustrating operations related to disconnecting a terminating connection leg in initializing an MO call dialed service according to an embodiment of the present invention. The operations are particularly related to disconnecting a terminating connection leg. The same operations occur in the CAMEL_SDS_MO_INIT procedure (step 105 of FIG. 3) for initializing the subscriber-specific MO call dialed service and the CAMEL_NDS_MO_INIT procedure (step 120 of FIG. 3) for initializing the network-specific MO call dialed service.

Figure 5A:
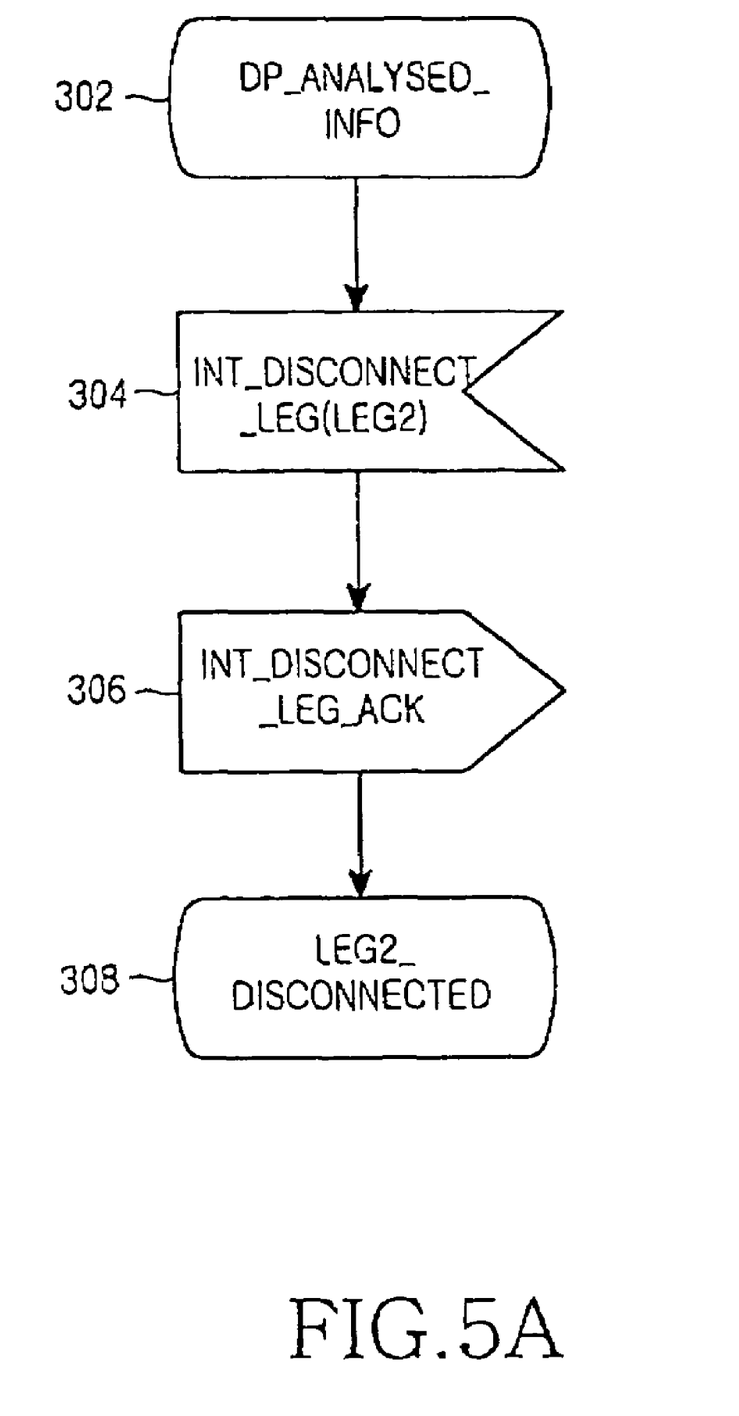
FIGS. 5A to 5D are flowcharts illustrating operations related to disconnection of a terminating connection leg in initializing the MO call dialed service according to an embodiment of the present invention.

Upon detection of generation of a CAMEL dialed service, that is, upon service triggering via a D-CSI during the basic call process for an MO call, the CCF of the MSC transmits to the SCP/CSE a message requesting invocation of the dialed service in the CAMEL_SDS_MO_INIT procedure and waits in a DP_Analysed_Info state.

Referring to FIG. 5A, the MSC waits in the DP Analysed Info state in step 302 and receives, from the SSF of the SCP, an Int_Disconnect_Leg (Leg2) message requesting disconnection of a terminating connection leg in step 304. In step 306, the MSC transmits an Int_Disconnect_Leg_Ack message in response to the Int_Disconnect_Leg message. The MSC then transitions to a Leg2_Disconnected state in which the terminating connection leg has been disconnected and waits for a next input command in step 308.

Figure 5B:
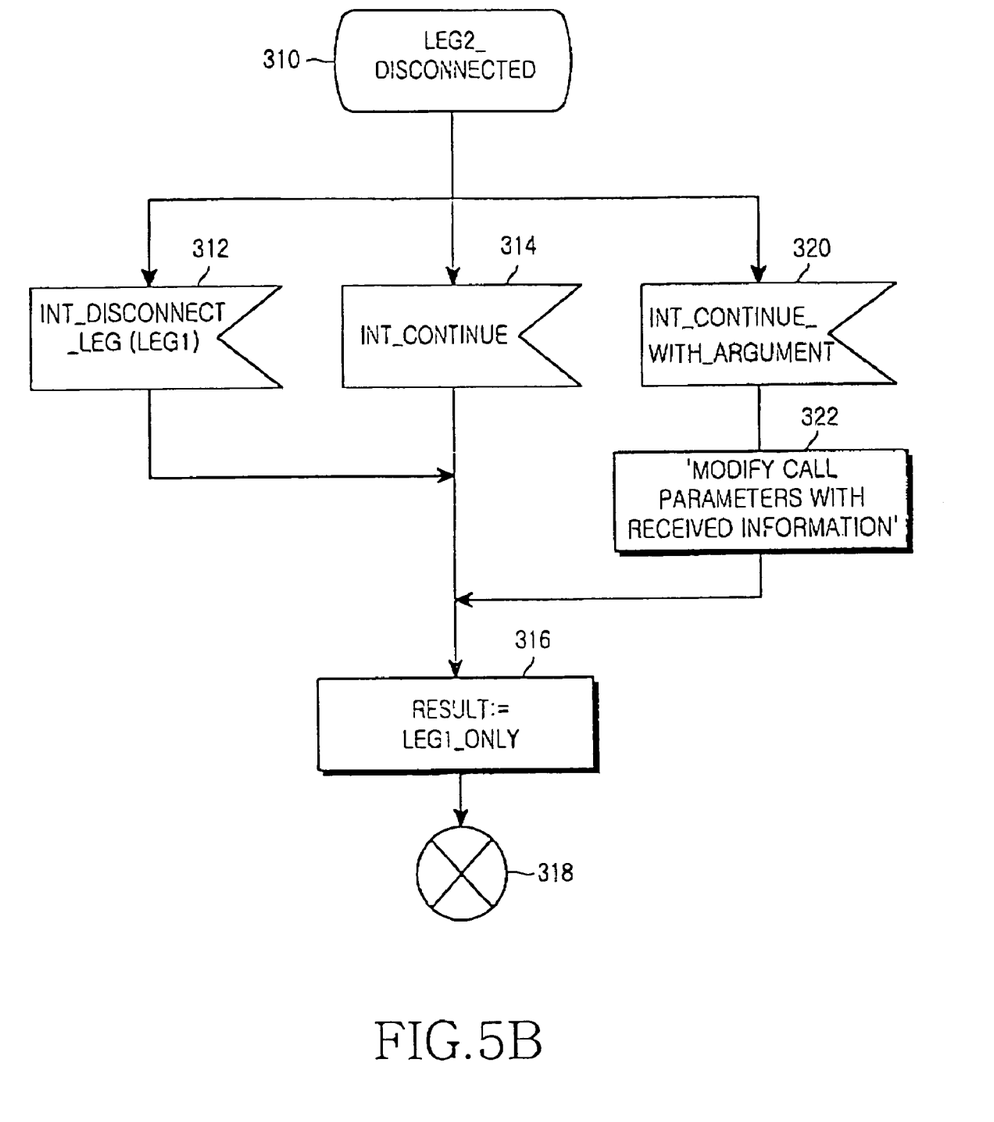

The MSC is in the Leg2_Disconnected state in step 310 of FIG. 5B. As requested by a caller or commanded by the SCP in the Leg2_Disconnected state, the MSC performs Int_Disconnect_Leg (Leg1), Int_Continue, and Int_Continue_With_Argument in an operation illustrated in FIG. 5B, Int_Establish_Temporary_Connection and Int_Connect_To_Resource in an operation illustrated in FIG. 5C, and Int_Release_Call. Int_Error and Release Transaction in an operation illustrated in FIG. 5D. Operations related to these messages will be described later.

Referring to FIG. 5B, upon receipt of the Int_Disconnect_Leg (Leg1) message requesting disconnection of an originating leg from the SCP through the SSF in step 312, the CCF of the MSC sets "Result:=Leg1_Only" in response to the Int_Disconnect_Leg (Leg1) message in step 316 and ends the CAMEL_SDS_MO_INT (or CAMEL_NDS_MO_INT) procedure in step 318.

"Result:=Leg1_Only" indicates that a terminating connection leg (leg2) has been released and only an originating connection leg (leg1) is connected at present, as a result of the CAMEL_SDS_MO_INT procedure. Then, the MSC returns to the CAMEL_MO_Dialled_Services procedure preceding the CAMEL_SDS_MO_INT procedure and transmits the procedure result.

Upon receipt of the Int_Continue message requesting continuation of an on-going call from the SCP through the SSF in step 314, the CCF of the MSC sets "Result:=Leg1_Only" in step 316 and ends the CAMEL_SDS_MO_INT procedure in step 318.

Upon receipt of the Int_Continue_With_Argument message requesting continuation of an on-going call according to modified information from the SCP through the SSF in step 320, the CCF of the MSC modifies information stored therein by the information received in the Int_Continue_With_Argument message in step 322, sets "Result:=Leg1_Only" in step 316, and ends the CAMEL_SDS_MO_INT procedure in step 318. The information to be modified is, for example, a calling number, supplementary service information, and a billing number.

Figure 5C:
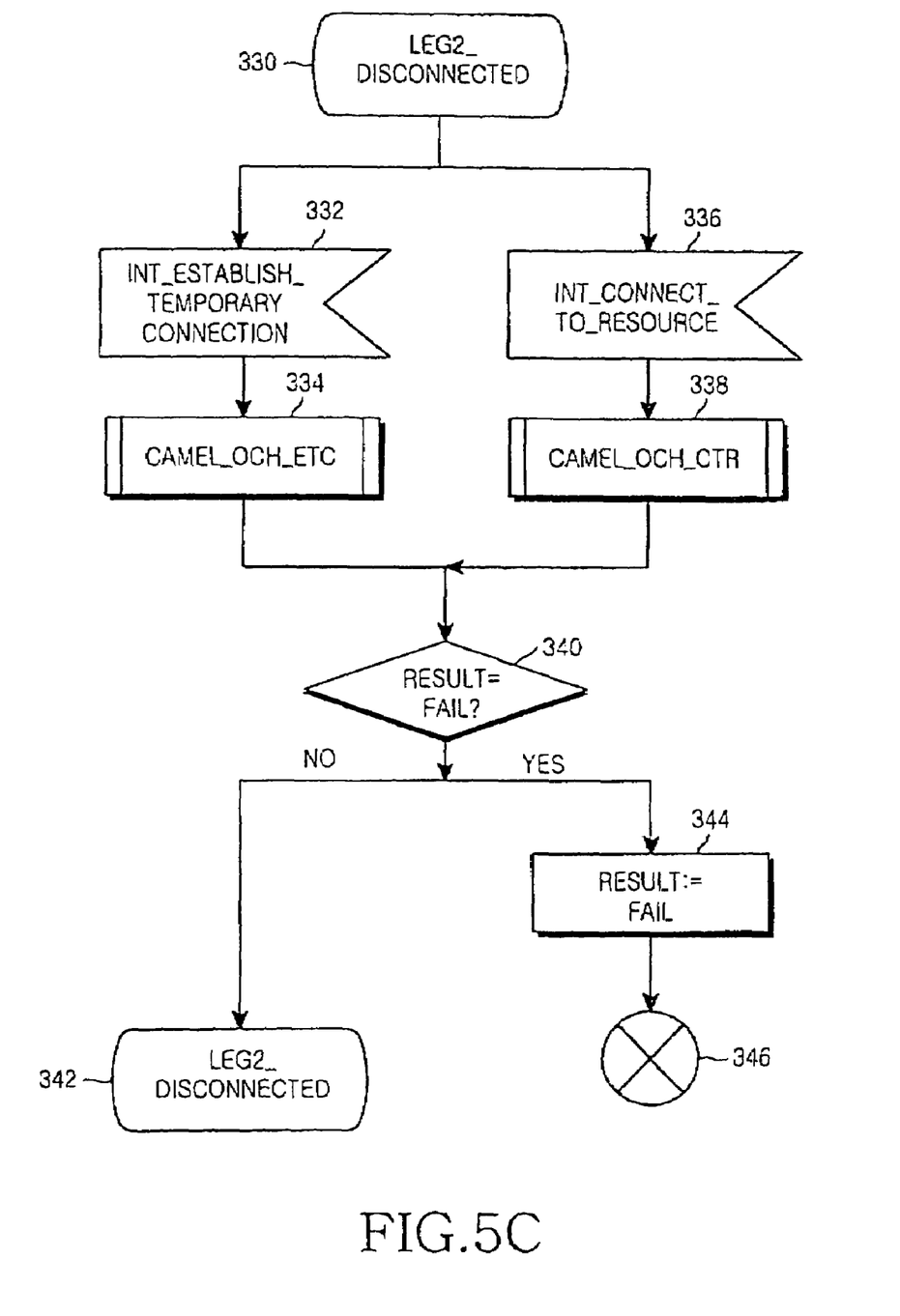

Referring to FIG. 5C, the MSC is in the Leg2_Disconnected state in step 330. Upon receipt of the Int_Establish_Temporary_Connection message requesting connection to a system that provides external resources from the SCP through the SSF in step 332, the CCF of the MSC invokes a CAMEL_OCH_ETC procedure for CAMEL call handling in step 334. In the CAMEL_OCH_ETC procedure, the MSC establishes a connection to an external resource system located in a physically different position from the MSC, is assigned to resources from the system, and then releases the connection. Such an external resource system may be a service resource function (SRF). After the CAMEL_OCH_ETC procedure, the MSC proceeds to step 340.

Upon receipt of the Int_Connect_To_Resource message requesting connection to a system that provides external resources from the SCP through the SSF in step 336, the CCF of the MSC invokes a CAMEL_OCH_CTR procedure in step 338. In the CAMEL_OCH_CTR procedure, the MSC establishes a connection to an SRF located in the physically same position as the MSC, is assigned to resources from the system, and then releases the connection. After the CAMEL_OCH_CTR procedure, the MSC proceeds to step 340.

In step 340, the MSC performs a query routine "Result=Fail?" to determine whether the result of the CAMEL_OCH_ETC or CAMEL_OCH_CTR procedure is "Fail". If "Result=Fail", the MSC sets "Result:=Fail" in step 344 and ends the CAMEL_SDS_MO_INT procedure in step 346. If "Result≠Fail", the MSC returns to the Leg2_Disconnected state in step 342.

Figure 5D:
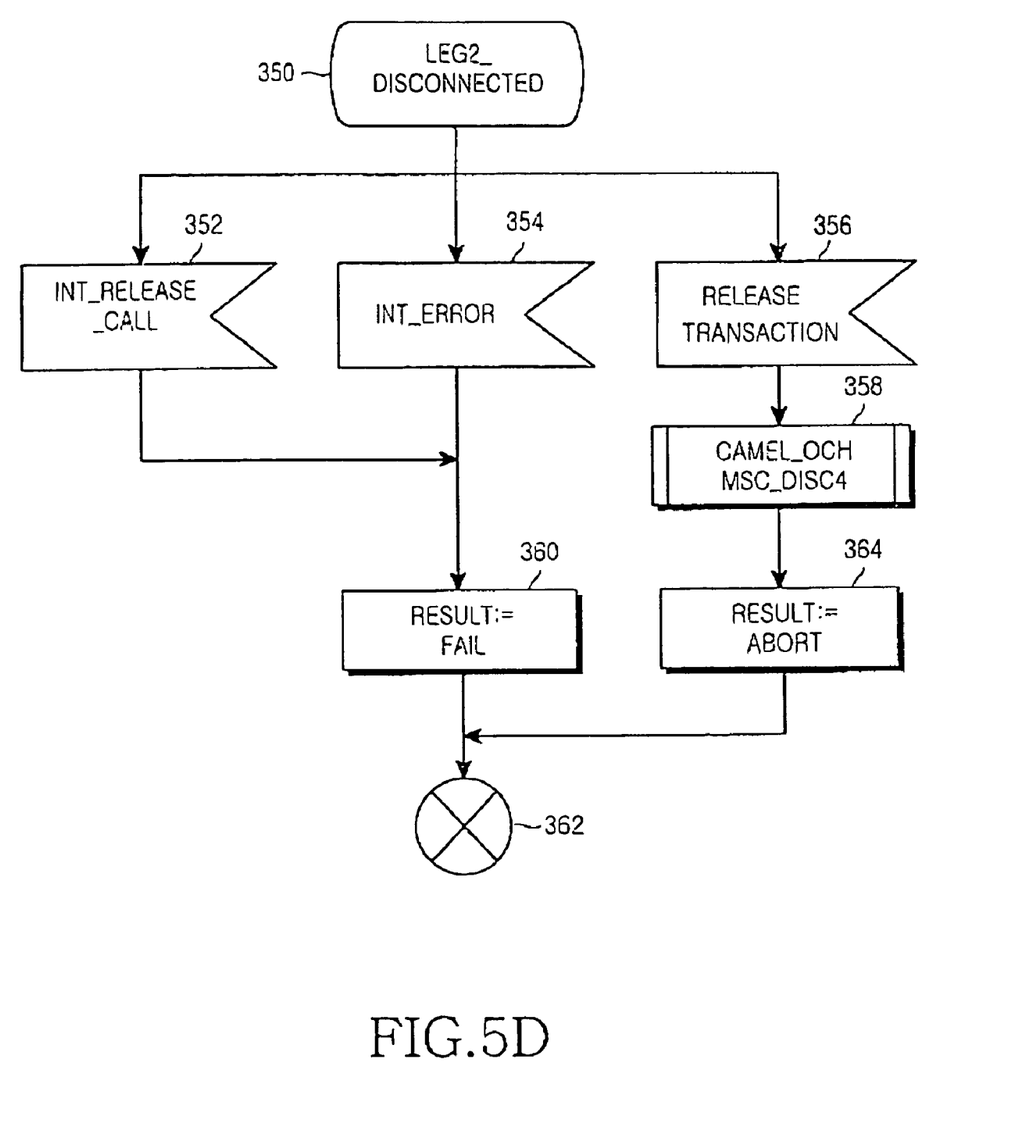

Referring to FIG. 5D, the MSC is in the Leg2_Disconnected state in step 350. Upon receipt of the Int_Release_Call message requesting release of an on-going call from the SCP through the SSF in step 352, or upon receipt of the Int_Error message indicating that errors are generated due to some cause from the SCP through the SSF in step 354, the MSC sets "Result:=Fail" in step 360 and ends the CAMEL_SDS_MO_INT procedure in step 362.

Upon receipt of the Release Transaction message reporting the event of a call release from a calling party in step 356, the MSC invokes a CAMEL_OCH_MSC_DISC4 procedure for CAMEL call handling in step 358. In the CAMEL_OCH_MSC_DISC4 procedure, the MSC transmits to the SCP and SSF a message indicating that the calling party has abandoned the call and receives a response for the message from the SCP. In step 364, the MSC sets "Result:= Abort" in step 364 and ends the CAMEL_SDS_MO_INT procedure in step 362.

The operations illustrated in FIGS. 5A to 5D are similarly applied to the CAMEL_SDS_CF_INIT (step 205 of FIG. 4) and the CAMEL_NDS_CF_INT procedure (step 215 of FIG. 4), except that the MSC receives a CF Cancelled message indicating call forwarding cancelled instead of the Release Transaction message reporting release of an originated call.

Figure 6:
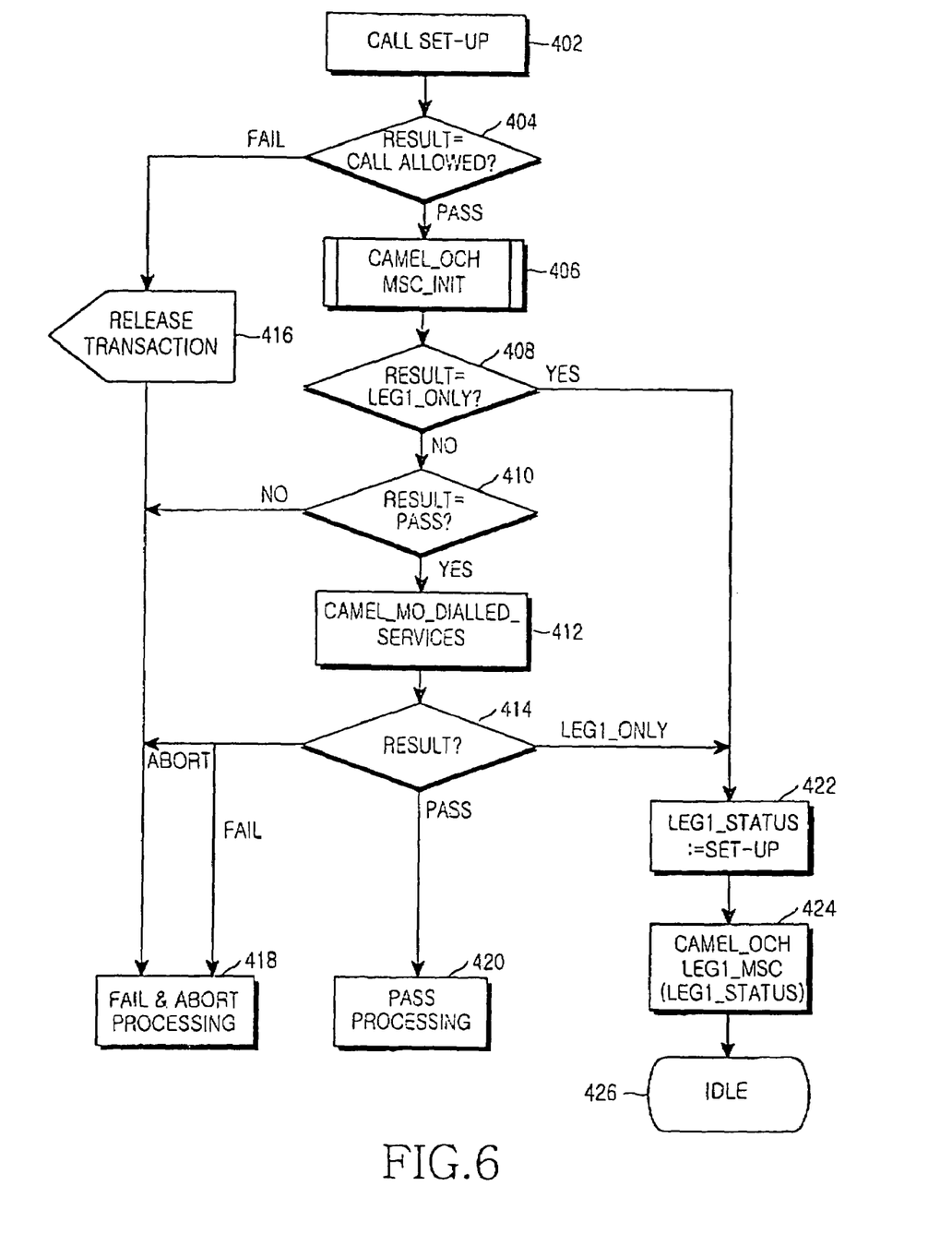
FIG. 6 is a flowchart illustrating a basic call procedure in an MSC to perform CAMEL handling for an MO call according to an embodiment of the present invention.

FIG. 6 is a flowchart illustrating a basic procedure for an MO call in an MSC according to an embodiment of the present invention. This basic call procedure is the OG_Call_Setup_MSC procedure.

Referring to FIG. 6, the basic call procedure for an MO call is initiated in step 402. In step 404, the MSC determines whether the MO call has been allowed. If the MO call is not allowed, the MSC transmits a Release Transaction message to a calling party in step 416 and performs a fail & abort call process in step 418. More specifically, the MSC transmits a message indicating failure of the call setup to the SCP and makes a report on the failure.

However, if the MO call is allowed (passes), the MSC performs a CAMEL_OCH_MSC_INT procedure to initialize a CAMEL MO call service by O-CSI service triggering in step 406. The result of the CAMEL_OCH_MSC_INT procedure is either Leg1_Only, Pass, or Fail.

In step 408, the MSC determines whether "Result=Leg1_Only?" with regard to the CAMEL_OCH_MSC_INT procedure. If "Result=Leg1_Only", that is, if only an originating connection leg remains, the MSC proceeds to step 422. Otherwise, the MSC determines whether "Result=Pass" with regard to the CAMEL_OCH_MSC_INT procedure in step 410. If "Result≠Pass", the MSC performs the Fail & Abort call process in step 418. If "Result=Pass", the MSC performs the CAMEL_MO_Dialled_Services procedure to handle the MO call by a D-CSI or an N_CSI in step 412. The CAMEL_MO_Dialled_Services procedure has been described in detail with reference to FIG. 3.

The MSC identifies the result of the CAMEL_MO_Dialled_Services procedure in step 414. If the result of the CAMEL_MO_Dialled_Services procedure is either Abort or Fail, the MSC performs the Fail & Abort call process in step 418. However, if the result of CAMEL_MO_Dialled_Services procedure is Pass, the MSC performs a Pass call process in step 420. Further, if the result of the CAMEL_MO_Dialled_Services procedure is Leg1_Only, the MSC proceeds to step 422.

In step 422, the MSC sets Leg1_Status to Set-Up to indicate the presence of the originating connection leg. The MSC performs a CAMEL_OCH_LEG1_MSC (Leg1_Status) procedure to control the originating connection leg in step 424. After completing the CAMEL_OCH_LEG1_MSC (Leg1_Status) procedure, the MSC returns to an idle state in step 426.

The CAMEL_OCH_LEG1_MSC (Leg1_Status) procedure in step 424 enables the MSC to receive and process a new command from the SCP even when an event such as a mid-call holding takes place with Leg1_Status:=Set-Up. Therefore, the MSC can perform a variety of functions including call waiting, call forwarding, and call connection, while only the originating connection leg exists. In the state where the originating connection leg is controlled, the MSC can receive messages requesting call waiting, call forwarding, and call connection, and a message reporting a mid-call event.

As described above, the MSC can support a variety of functions with a terminating connection leg disconnected and only an originating connection leg connected, during a D-CSI or an N-CSI triggered dialed service.

Figure 7:
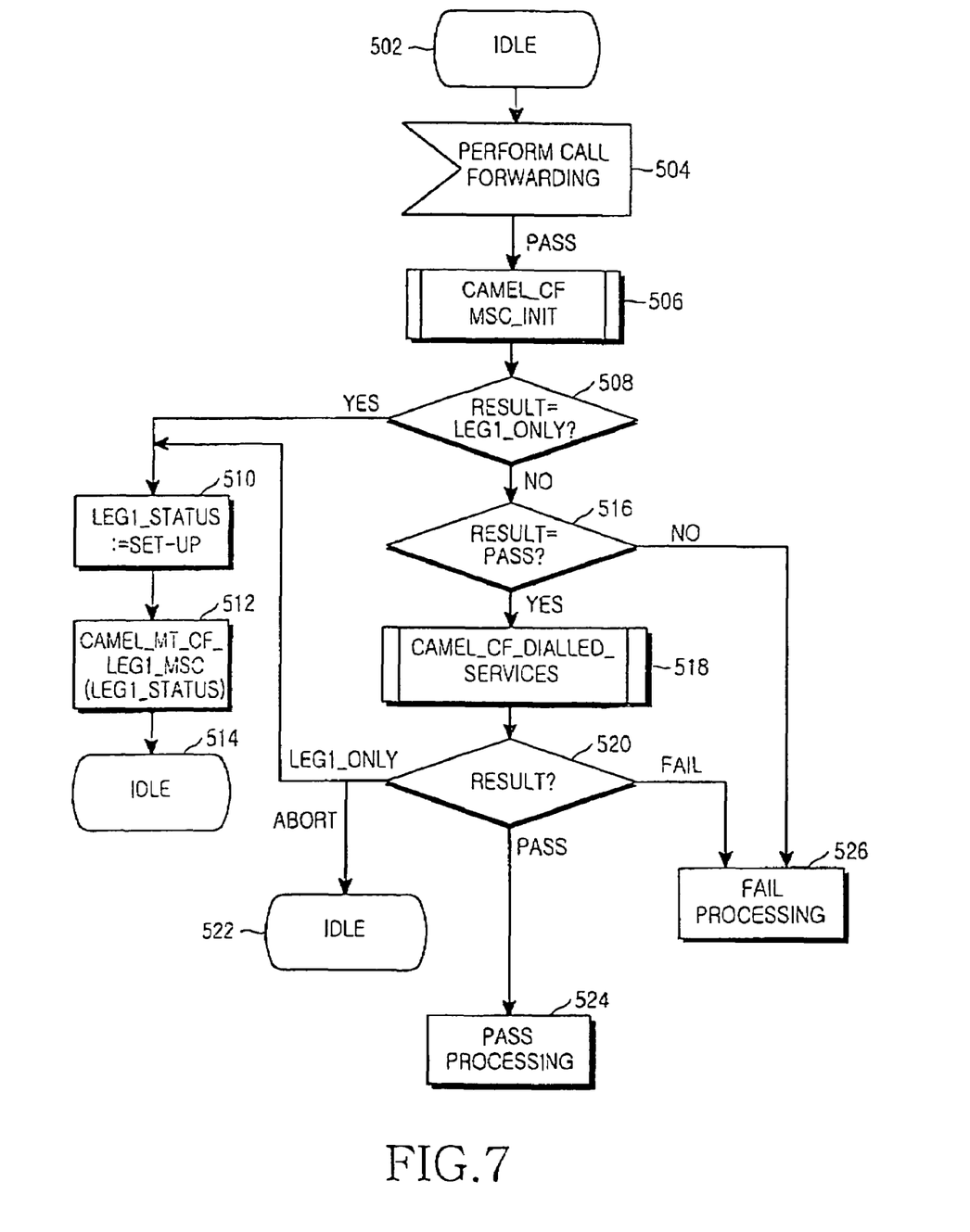
FIG. 7 is a flowchart illustrating a basic call procedure in the MSC to perform CAMEL handling for an MF call according to an embodiment of the present invention.

FIG. 7 is a flowchart illustrating a basic call procedure for an MF call in the MSC according to an embodiment of the present invention. The basic call procedure for an MF call is the MT_CF_MSC procedure.

Referring to FIG. 7, a call for a mobile subscriber is in an idle state in step 502. Upon receipt of a call forwarding message requesting handling of an MF call from a calling party in step 504, the MSC performs the CAMEL_CF_MSC_INT procedure to initialize a CAMEL call forwarding service in step 506. The result of the CAMEL_CF_MSC_INT procedure can be either Leg1_Only, Pass, or Fail.

In step 508, the MSC determines whether "Result=Leg1_Only". If Result=Leg1_Only, which implies that only an originating connection leg is connected, the MSC proceeds to step 510. Otherwise, if Result≠Leg1_Only, the MSC determines whether "Result=Pass" in step 516. If "Result≠Pass", the MSC performs a Fail call process in step 526. If "Result=Pass", the MSC performs the CAMEL_CF_Dialled_Services procedure for CAMEL handling of the MF call by the D-CSI or N-CSI in step 518. The CAMEL_CF_Dialled_Services procedure has been described in detail with reference to FIG. 4.

In step 520, the MSC identifies the result of the CAMEL_CF_Dialled_Services procedure. If "Result=Fail", the MSC performs the Fail call process in step 526. If "Result=Abort", the MSC returns to the idle state in step 522. If "Result=Pass", the MSC performs a Pass call process in step 524. If "Result=Leg1_Only", the MSC proceeds to step 510.

In step 510, the MSC sets Leg1_Status to Set-up to notify the presence of the originating connection leg. The MSC performs the CAMEL_MT_CF_LEG1_MSC (Leg1_Status) procedure to control the originating connection leg for the MF call in step 512. By step 512, even upon generation of an event such as a mid-call holding in the state that Leg1_Status is Set-up, the MSC is capable of handling a new command from the SCP. Thus, the MSC can perform a variety of functions including call waiting, call forwarding, and call connection for an MF call with only the originating connection leg connected. After the CAMEL_MT_CF_LEG1_MSC (Leg1_status) procedure, the MSC returns to the idle state in step 514.

In the present invention, disconnecting a terminating connection leg is supported even in D-CSI and N-CSI triggered CAMEL dialed services. As a result, various functions including call connection, error message handling, call continuation, call release, call waiting, and call forwarding can be provided, which the existing CAMEL dialed services do not support.

Even if a CAMEL service subscriber subscribes to a plurality of CAMEL services and the CAMEL services are triggered by different CSI, that is, O-CSI and D-CSI, the D-CSI triggered CAMEL services can support supplementary services such as disconnection of a terminating connection leg as well as existing basic functions. Network-specific CAMEL dialed services triggered via N-CSI are also enhanced. Therefore, mobile communication network operators can provide subscribers each subscribed to a plurality of CAMEL services with various functions through different CSI.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of disconnecting a terminating connection leg in a dialed service for a mobile subscriber in a mobile switching center (MSC) for providing a mobile intelligent network service to the mobile subscriber under a control of a service control point (SCP) in a mobile intelligent network, comprising the steps of:

transmitting a service request message to the SCP in a call initialization procedure for handling one of a mobile originating (MO) and a mobile forwarding (MF) call;

entering a waiting state;

receiving a message requesting disconnection of the terminating connection leg from the SCP;

transmitting an acknowledgement for the message requesting disconnection of the terminating connection leg to the SCP;

releasing the terminating connection leg with an originating connection leg maintained;

entering a terminating connection leg disconnected state;

setting a result of the call initialization procedure to "terminating connection leg disconnected", upon receiving a message requesting call continuation from the SCP in the terminating connection leg disconnected state;

upon receiving a message requesting call continuation according to modified information in the terminating connection leg disconnected state, modifying stored information with information included in the message requesting call continuation, and setting the result of the call initialization procedure to "terminating connection leg disconnected"; and providing available supplementary functions after disconnecting the terminating connection leg under the control of the SCP, if the result of the call initialization procedure is "terminating connection leg disconnected".

2. The method of claim 1, further comprising the step of setting the result of the call initialization procedure to "terminating connection leg disconnected", upon receiving a message requesting disconnection of the originating connection leg from the SCP in the terminating connection leg disconnected state.

3. The method of claim 1, further comprising the steps of:

upon receipt of a message requesting connection to an external resource system from the SCP in the terminating connection leg disconnected state, establishing a connection to an external resource system, being assigned to resources from the external resource system, and then releasing the connection to the external resource system; and determining whether the resource assignment is successful and, if the resource assignment is successful, returning to the terminating connection leg disconnected state.

4. The method of claim 1, further comprising the steps of:

setting the result of the call initialization procedure to "fail" and terminating the call initialization procedure, upon receiving a message requesting one of call release and a message indicating an error generation from the SCP in the terminating connection leg disconnected state; and setting the result of the call initialization procedure to "abort" and terminating the call initialization procedure, upon receiving one of a message reporting a call release event from a calling party and a message reporting an MF call cancel from the SCP in the terminating connection leg disconnected state.

5. The method of claim 1, wherein the step of providing the supplementary functions comprises the steps of:

determining the result of the call initialization procedure, after the call initialization procedure;

if the result of the call initialization procedure is "terminating connection leg disconnected", setting the result of one of the MO and the MF call dialed service procedure to "terminating connection leg disconnected"; and if the result of the one of the MO and MF call dialed service procedure is "terminating connection leg disconnected", setting the status of the originating connection leg to set-up, controlling the originating connection leg under a control of the SCP, and providing the supplementary functions.

6. A method of disconnecting a terminating connection leg in a dialed service for a mobile subscriber in a mobile switching center (MSC) for providing a mobile intelligent network service to the mobile subscriber under a control of a service control point (SCP) in a mobile intelligent network, comprising the steps of:

setting up a mobile originating (MO) call;

determining whether the MO call is allowed;

performing a service initialization procedure for handling the MO call, if the MO call is allowed;

performing an MO call dialed service procedure, if a result of the service initialization procedure is "pass";

controlling an originating connection leg under a control of the SCP, if a result of the MO call dialed service procedure is "leg1_only"; and providing available supplementary functions after disconnecting the terminating connection leg.

7. The method of claim 6, wherein the step of performing the MO call dialed service procedure comprises the steps of:

performing a subscriber-specific MO call initialization procedure;

suppressing MO call subscriber information and performing a network-specific MO call initialization procedure, if a result of the subscriber-specific MO call initialization procedure is "pass";

performing a normal call process, if a result of the network-specific MO call initialization procedure is "pass"; and setting the result of the MO call dialed service procedure to "termination connection leg disconnected", if one of the result of the subscriber-specific MO call initialization procedure and the result of the network-specific MO call initialization procedure is "terminating connection leg disconnected".

8. The method of claim 7, wherein each of the step of performing the subscriber-specific MO call initialization procedure and the step of performing the network-specific MO call initialization procedure comprises the steps of:

upon receiving a message requesting disconnection of the terminating connection leg from the SCP in a waiting state after transmitting a service request message to the SCP, transmitting an acknowledgement for the received message to the SCP, releasing the terminating connection leg with the originating connection leg maintained, and entering a terminating connection leg disconnected state;

setting a result of the MO call initialization procedure to "terminating connection leg disconnected", upon receiving a message requesting call continuation from the SCP in the terminating connection leg disconnected state;

upon receipt of a message requesting call continuation according to modified information in the terminating connection leg disconnected state, modifying stored information with information included in the message requesting call continuation, and setting the result of the MO call initialization procedure to "terminating connection leg disconnected"; and providing the available supplementary functions after disconnecting the terminating connection leg under the control of the SCP, if the result of the MO call initialization procedure is "terminating connection leg disconnected".

9. The method of claim 8, further comprising the step of setting the result of the MO call initialization procedure to "terminating connection leg disconnected", upon receiving a message requesting disconnection of the originating connection leg from the SCP in the terminating connection leg disconnected state.

10. The method of claim 8, further comprising the steps of:

upon receiving a message requesting a connection to an external resource system from the SCP in the terminating connection leg disconnected state, establishing a connection to the external resource system, being assigned to resources from the external resource system, and then releasing the connection to the external resource system;

determining whether the resource assignment is successful; and if the resource assignment is successful, returning to the terminating connection leg disconnected state.

11. The method of claim 8, further comprising the steps of:

setting the result of the MO call initialization procedure to "fail" and terminating the MO call initialization procedure, upon receiving a message requesting one of a call release and a message indicating error generation from the SCP in the terminating connection leg disconnected state; and setting the result of the MO call initialization procedure to "abort" and terminating the MO call initialization procedure, upon receiving a message reporting a call release from the SCP in the terminating connection leg disconnected state.

12. A method of disconnecting a terminating connection leg in a dialed service for a mobile subscriber in a mobile switching center (MSC) for providing a mobile intelligent network service to the mobile subscriber under a control of a service control point (SCP) in a mobile intelligent network, comprising the steps of:

receiving a message requesting a mobile forwarding (MF) call handling for the mobile subscriber in an idle state;

performing a service initialization procedure for handling the MF call;

performing an MF call dialed service procedure, if a result of the service initialization procedure is "pass"; and controlling an originating connection leg under a control of the SCP, if a result of the MF call dialed service procedure is "leg1_only", and providing available supplementary functions after disconnecting the terminating connection leg.

13. The method of claim 12, wherein the step of performing the MF call dialed service procedure comprises the steps of:

performing a subscriber-specific MF call initialization procedure;

performing a network-specific MF call initialization procedure, if a result of the subscriber-specific MF call initialization procedure is "pass";

performing a normal call process, if a result of the network-specific MF call initialization procedure is "pass"; and setting a result of the MF call dialed service procedure to "termination connection leg disconnected", if a result of one of the subscriber-specific MF call initialization procedure and the network-specific MF call initialization procedure is "terminating connection leg disconnected".

14. The method of claim 13, wherein each of the step of performing the subscriber-specific MF call initialization procedure and the step of performing the network-specific MF call initialization procedure comprises the steps of:

upon receipt of a message requesting disconnection of the terminating connection leg from the SCP in a waiting state after transmitting a service request message to the SCP, transmitting an acknowledgement for the received message to the SCP, releasing the terminating connection leg with an originating connection leg maintained, and entering a terminating connection leg disconnected state;

setting a result of the MF call initialization procedure to "terminating connection leg disconnected", upon receipt of a message requesting call continuation from the SCP in the terminating connection leg disconnected state;

upon receipt of a message requesting call continuation according to modified information in the terminating connection leg disconnected state, modifying stored information with information included in the message requesting call continuation, and setting the result of the MF call initialization procedure to "terminating connection leg disconnected"; and providing the available supplementary functions after disconnecting the terminating connection leg under the control of the SCP, if a result of the MF call initialization procedure is "terminating connection leg disconnected".

15. The method of claim 14, further comprising the step of setting the result of the MF call initialization procedure to "terminating connection leg disconnected", upon receiving a message requesting disconnection of the originating connection leg from the SCP in the terminating connection leg disconnected state.

16. The method of claim 14, further comprising the steps of:
   upon receiving a message requesting connection to an external resource system from the SCP in the terminating connection leg disconnected state, establishing a connection to an external resource system, being assigned to resources from the external resource system, and then releasing the connection to the external resource system;
   determining whether the resource assignment is successful; and
   if the resource assignment is successful, returning to the terminating connection leg disconnected state.

17. The method of claim 14, further comprising the steps of:
   setting the result of the MF call initialization procedure to "fail" and terminating the MF call initialization procedure, upon receiving one of a message requesting call release and a message indicating error generation from the SCP in the terminating connection leg disconnected state; and
   setting the result of the MF call initialization procedure to "abort" and terminating the MF call initialization procedure, upon receiving a message reporting a call release from a calling party from the SCP in the terminating connection leg disconnected state.

18. A system for disconnecting a terminating connection leg, while maintaining an originating connection leg for a call in a customized applications for mobile network enhanced logic (CAMEL) service network, comprising:
   a service control point (SCP) for controlling CAMEL services; and
   a mobile switching center (MSC) for providing the CAMEL services to mobile subscribers under a control of the SCP,
   wherein the MSC performs the steps of:
   receiving a message (Int_Disconnect_Leg (Leg2)) requesting disconnection of the terminating connection leg from the SCP in a DP_Analysed_Info waiting state, after transmitting a service request message to the SCP in a call initialization procedure for handling of one of a mobile originating (MO) and a mobile forwarding (MF) call;
   transmitting an acknowledgement (Int_Disconnect_Leg_Ack) for the message requesting disconnection of the terminating connection leg (Leg2) to the SCP, releasing the terminating connection leg with an originating connection leg (Leg1) maintained, and entering a terminating connection leg disconnected state (Leg2_Disconnected);
   setting a result of the call initialization procedure to "terminating connection leg disconnected (Leg1_Only)", upon receiving a message (Int_Continue) requesting call continuation from the SCP in the Leg2_Disconnected state;
   upon receipt of a message (Int_Continue_With_Argument) requesting call continuation according to modified information in the Leg2_Disconnected state, modifying stored information by information included in the Int_Continue_With_Argument message, and setting the result of the call initialization procedure to "Leg1_Only"; and
   providing available supplementary functions after disconnecting the terminating connection leg under a control of the SCP, if a result of the call initialization procedure is "Leg1_Only".

19. The system of claim 18, wherein the MSC further performs the step of setting the result of the call initialization procedure to "Leg1_Only", upon receiving a message (Int_Disconnect_Leg1 (Leg1)) requesting disconnection of the originating connection leg from the SCP in the Leg2_Disconnected state.

20. The system of claim 18, wherein the MSC further performs the steps of:
   upon receiving one of a message (Int_Establish_Temporary_Connection and Int_Connect_To_Resource) requesting connection to an external resource system from the SCP in the Leg2_Disconnected state, establishing a connection to the external resource system, being assigned to resources from the external resource system, and then releasing the connection to the external resource system;
   determining whether the resource assignment is successful; and
   if the resource assignment is successful, returning to the Leg2_Disconnected state.

21. The system of claim 18, wherein the MSC further performs the steps of:
   setting the result of the call initialization procedure to "fail" and terminating the call initialization procedure, upon receiving one of a message (Int_Release_Call) requesting call release and a message (Int_Error) indicating error generation from the SCP in the Leg2_Disconnected state; and
   setting the result of the call initialization procedure to "abort" and terminating the call initialization procedure, upon receiving one of a message (Release Transaction) reporting a call release event from a calling party and a message (CF Cancelled) reporting an MF call cancel from the SCP in the Leg2_Disconnected state.

22. The system of claim 18, wherein in the step of providing the supplementary functions, the MSC performs the steps of:
   determining a result of the call initialization procedure after the call initialization procedure;
   if the result is "Leg1_Only", setting the result of the one of the MO and the MF call dialed service procedure to "Leg1_Only"; and
   if the result of the one of the MO and the MF call dialed service procedure is "Leg1_Only", setting the status of the originating connection leg to set-up, performing a procedure for controlling the originating connection leg under the control of the SCP, and providing the supplementary functions.

* * * * *